United States Patent

[11] 3,601,631

[72] Inventor Donald K. Miller
San Jose, Calif.
[21] Appl. No. 751,946
[22] Filed Aug. 12, 1968
[45] Patented Aug. 24, 1971
[73] Assignee Hewlett-Packard Company
Palo Alto, Calif.

[54] BINARY INPUT CONTROLLED GATE CIRCUIT FOR ANALOG TYPE SIGNALS
4 Claims, 5 Drawing Figs.

[52] U.S. Cl. .......... 307/209, 307/243, 307/256
[51] Int. Cl. .......... H03k 17/00
[50] Field of Search .......... 307/200, 243, 218, 256, 241, 209, 253

[56] References Cited

UNITED STATES PATENTS

| | | | |
|---|---|---|---|
| 2,862,171 | 11/1958 | Freeborn | 307/253 |
| 2,970,227 | 1/1961 | Horton et al | 307/243 |
| 3,131,309 | 4/1964 | Blocher Jr. | 307/253 |
| 3,373,298 | 3/1968 | Tompkins et al. | 307/256 |
| 3,441,862 | 4/1969 | Mitchell | 307/243 |

OTHER REFERENCES

Digital Computer Componets and Cirquits by R. K. Richards, D. Von Nostrand Com. Inc. New Jersey, Nov. 1957, Lib# TK 7888.3 R5d pages 54, and 55

*Primary Examiner*—Donald D. Forrer
*Assistant Examiner*—B. P. Davis
*Attorney*—Stephen P. Fox

ABSTRACT: A gate circuit includes a transistor which receives dual polarity analog-type input signals and conducts either as a forward or inverted gain amplifier or as two diodes to provide dual polarity output signals. The transistor is controlled at the base electrode thereof by resistor-diode logic circuitry responsive to binary signals having magnitudes greater than the duel polarity input signals. A plurality of the transistor gate circuits in combination permit time multiplexing of duel polarity signals to an analog type of load such as a magnetic head in an NRZ recording system.

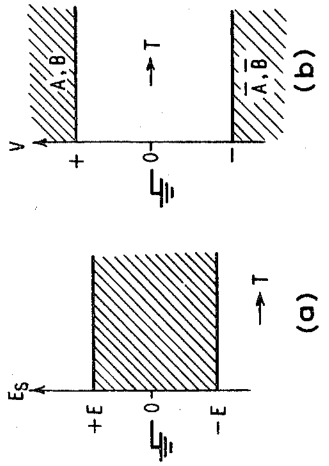
Figure 2
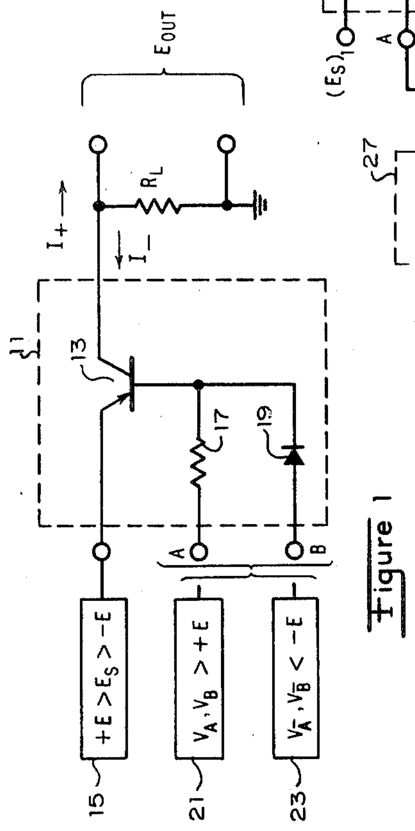
Figure 1
| $E_S$ | A | B | $E_{OUT}$ |
|---|---|---|---|
| +E | + | + | 0 |
| +E | + | - | 0 |
| +E | - | + | 0 |
| +E | - | - | + |
| -E | - | - | - |
| -E | - | + | 0 |
| -E | + | - | 0 |
| -E | + | + | 0 |
Figure 3
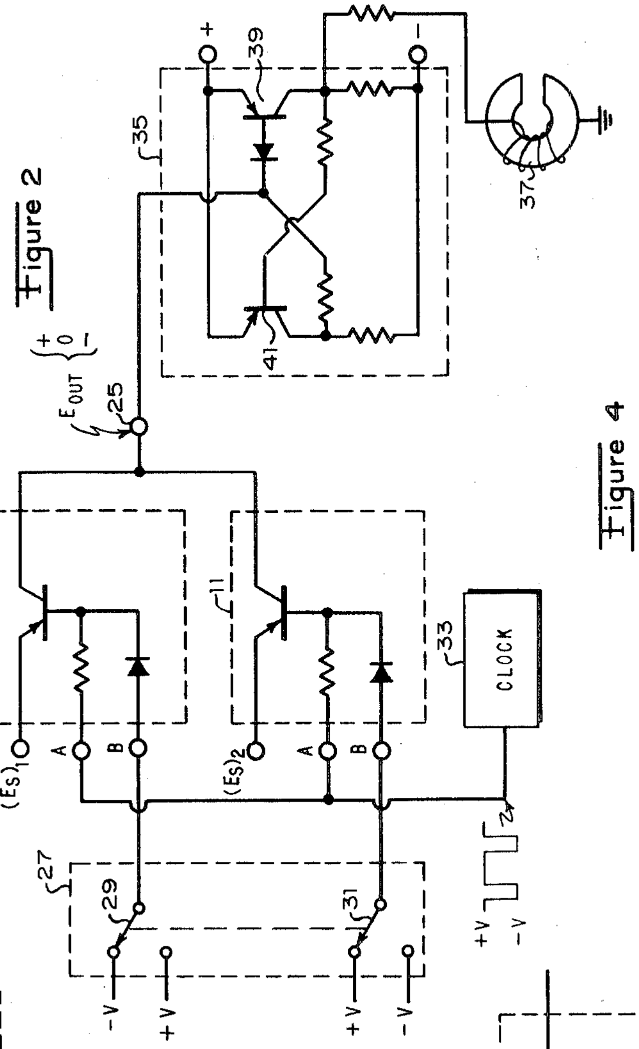
Figure 4
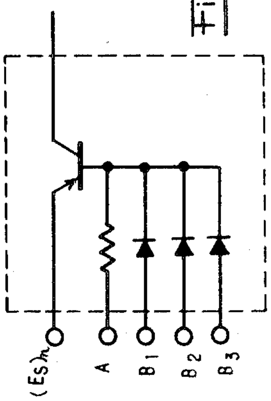
Figure 5
INVENTOR
DONALD K. MILLER
BY Stephen P. Fox
AGENT

BINARY INPUT CONTROLLED GATE CIRCUIT FOR ANALOG TYPE SIGNALS

BACKGROUND OF THE INVENTION

Typical logic circuits employ binary signals; however circuit design may often be simplified and/or additional logic may be achieved if the control signals are not merely binary, but instead have three or more levels. Additionally, such multilevel signals are particularly useful in circuit applications wherein two or more dual polarity voltage signals are required to drive an analog type of load such as a magnetic recording head. In order to reduce overall circuit complexity and cost, it is desirable that the logic gates for these multilevel or analog type signals utilize a minimum number of components.

SUMMARY OF THE INVENTION

The present invention, in one of the illustrated embodiments, features a gate circuit providing a multilevel analog type of signal output represented, for example, by positive, negative and zero signal conditions. The gate circuit includes a transistor, the emitter of which receives a dual polarity input signal and the collector of which supplies dual polarity output signals to a load. When the transistor is gated on, it operates either in one mode as an amplifier with a forward current gain, or in another mode as two diodes or as an amplifier with an inverted gain. The particular mode of operation depends on the polarity of the input signal and the transistor characteristics. The conductivity of the transistor is controlled at the base electrode thereof by resistor and diode circuitry responsive to binary signals, the magnitudes of which bear predetermined relationships to the input signal applied to the emitter.

The gate circuit of the present invention is particularly advantageous for time multiplexing a plurality of input signals to a single three condition output. In one embodiment of the invention signal multiplexing is achieved with two of the above-described binary input controlled transistor gates in a circuit for sequentially driving a load into a positive or a negative voltage output state. The load may be a bistable multivibrator in which case when either of the transistor gate circuits provides a zero level signal, the bistable multivibrator operates to retain its previously selected state. The output of the multivibrator may be used, for example, to drive a magnetic recording head in an NRZ recording system.

BRIEF DESCRIPTION OF THE DRAWING

FIG. 1 is a schematic diagram of the present invention in one embodiment.

FIG. 2*a* and *b* are graphs illustrating the ranges of acceptable input and control voltage values in operation of the present invention.

FIG. 3 is a truth table contributing to an understanding of the operation of the present invention.

FIG. 4 is a schematic diagram of the present invention in another embodiment.

FIG. 5 is a schematic diagram of another embodiment of one aspect of the invention.

DESCRIPTION OF THE PREFERRED EMBODIMENTS

Referring now to FIG. 1, there is shown a gate circuit 11 including a PNP-type transistor 13, the emitter electrode of which receives a dual polarity input signal $E_S$ from a voltage source 15, and the collector electrode of which provides a multilevel output signal $E_{OUT}$ across a load resistor $R_L$. The conductivity of transistor 13 is controlled by binary input signals A and B applied to the base electrode thereof through a resistor 17 and a diode 19. The input terminals for the A and B signals are connectable in various combinations to the binary voltage sources 21 and 23 by suitable control or switching circuitry, not shown. The voltage sources 21, 23 and 15 preferably have a low output impedance relative to the value of load resistor $R_L$.

The magnitudes of the dual polarity input signal $E_S$ and the binary signals A, B must be within certain ranges bearing a predetermined relationship to one another. The acceptable range of $E_S$ is between predetermined voltage levels $\pm E$, as shown by the shaded area in the graph of FIG. 2*a*. The binary input levels provided by voltage sources 21, 23 and corresponding to A, B and $\bar{A}$, $\bar{B}$ must be respectively greater than $+E$ and less than $-E$, as illustrated by the shaded area in the graph of FIG. 2*b*.

The operation of the gate circuit 11 may be understood with reference to the truth table of FIG. 3. In the input signal $E_S$ is positive with respect to ground, at some value between zero and $+E$, and if either one or both of the binary inputs A, B is connected to the positive voltage source 21, then transistor 13 is reverse-biased. Therefore, no current flows in the load resistor $R_L$ and the output signal $E_{OUT}$ is zero. If both of the binary inputs are negative, corresponding to $\bar{A}$ and $\bar{B}$, then transistor 13 is forward biased and a positive current I+flows through resistor $R_L$. Thus the output signal $E_{OUT}$ is positive. Diode 19 is reverse biased, so no base current flows therethrough.

FIG. 3 also illustrates the various conditions of the output signal $E_{OUT}$ when the input signal $E_S$ to the emitter electrode of transistor 13 is negative with respect to ground, at some value between zero and $-E$. In this situation, the transistor 13 is reverse biased whenever either one or both of the binary inputs A, B is positive. Thus no current flows through the load resistor $R_L$ and the output signal $E_{OUT}$ thereacross is zero.

When the input signal $E_S$ is negative and both of the binary inputs are negative, corresponding to $\bar{A}$ and $\bar{B}$, the emitter base diode junction of transistor 13 is forward biased and base current flows through resistor 17; however, positive current $I_+$ cannot flow through the collector electrode because it is referenced to ground or zero potential which is more positive than the emitter input signal $E_S$. A distinguishing feature of the gate circuit is that the relative voltage levels applied to the transistor 13 cause the collector-base diode junction to be forward biased. The transistor may operate with an inverted gain wherein the collector and emitter electrodes are effectively electrically interchanged. Alternatively, if the base current exceeds the maximum permissible current through resistor $R_L$, the transistor operates as two forward biased diodes. The particular type of operation depends on the transistor characteristics and the input voltages thereto. In either case, a negative current $I_1$ flows from ground through resistor $R_L$. The relative voltage levels across diode 19 cause it to be reverse biased so no current flows therethrough. The negative current $I_1$ can be adjusted to the same magnitude as the positive current $I_+$by appropriately choosing the resistance values of resistors 17 and $R_L$.

It can be seen that the dual polarity input signals between $\pm E$ are gated to the output in response to the combination of the negative binary input control signals, $\bar{A}$, $\bar{B}$. Diode 19 conducts to inhibit current flow through resistor $R_L$ whenever the binary input B is positive. The output $E_{OUT}$ has three possible conditions corresponding to positive, negative and zero signals. The positive and negative output signals are of an analog type since the magnitudes thereof depend on the particular value of the input signal $E_S$ at any given time.

FIG. 4 illustrates another embodiment of the invention in a circuit combination for time multiplexing a plurality of input signals to produce sequential three-condition output signals for driving a load which is characterized by particular input requirements, hereinafter described. This embodiment includes two of the above-described gate circuits 11 which receive input signals $(E_S)_1$ and $(E_S)_2$ having voltage values between $+E$ and $-E$ (FIG. 2*a*). The B binary inputs of the two gate circuits are connected to suitable switching means 27 for providing selected output combinations of the binary control voltages $\pm V$ which represent A, B and $\bar{A}$, $\bar{B}$ (FIG. 2*b*). The switching means 27 may be ganged pair of single-pole double-throw switches 29 and 31, as shown, or suitable binary logic circuitry. The A binary inputs of the two gate circuits 11 are connected to a clock 33 which produces a pulse signal based on the binary voltage levels ±V, as shown. The collector electrodes of the two gate circuits 11 are connected to a common output terminal 25. If the ganged double-throw switches 29, 31 are moved to alternate positions coincidentally with the occurrence of a pulse from clock 33, the output signal at terminal 25 will alternately represent the input signals $(E_S)_1$ and $(E_S)_2$. Each of these two signals has three possible conditions, corresponding to "+", "0" and "−" current levels.

Although FIG. 4 illustrates a time multiplexing system for two dual polarity input signals, it is to be noted that the scope of the present invention comprehends a system in which a larger number of dual polarity input signals, it is to be noted that the scope of the present invention comprehends a system in which a larger number of dual polarity signals may be multiplexed. For example, if eight signals are combined, eight gate circuits will be required and the switching means 27 would be three-stage binary counter capable of counting to eight. The configuration of each gate circuit in this situation is shown in FIG. 5. Each gate circuit has an input for receiving a different one of the eight dual polarity signals $(E_S)_n$. Additionally, each gate circuit has one binary input A, for receiving a clock pulse, and three additional binary inputs, $B_1$, $B_2$, $B_3$, connected in selected combinations to the three pairs of complementary outputs of the three-stage binary counter, so that at any given count, a different one of the eight gate circuits will be enabled. The three binary inputs $B_1$ , $B_2$, $B_3$ are coupled in parallel through individual diodes to the base electrode of the transistor. When the collectors of the eight transistors are connected in parallel to a common output terminal, the multilevel output signal therefrom is a time multiplexed representation of the eight input signals.

Referring again to FIG. 4, the multilevel output signals from the common terminal 25 are coupled to a bistable multivibrator 35, which in turn drives a magnetic recording head 37. The bistable multivibrator 35 includes two transistors 39 and 41. When a positive output signal appears at terminal 25, transistor 39 becomes nonconducting and transistor 41 conducts so that a negative signal is applied to the recording head 37. Conversely, a negative output signal at terminal 25 renders transistor 39 conducting and transistor 41 nonconducting so that a positive signal is applied to the recording head. When the third condition, namely a zero current signal, is present at the output terminal the bistable multivibrator operates in a memory-hold condition to retain its previously selected state.

It can be seen that in overall operation of the circuit combination of FIG. 4, a plurality of dual polarity input signals individually control the positive and negative driving voltages for the magnetic recording head. Since only positive and negative voltages are applied to the recording head, the circuit is particularly useful in a non-return-to-zero (NRZ) digital information recording system.

I claim:

1. A binary input controlled signal gate comprising:
- a transistor having first and second main current carrying electrodes and a control electrode, said control electrode being either an N or a P type conductivity material;
- a signal source connected to said first main current carrying electrode, said signal source providing an analog signal within predetermined positive and negative voltage values;
- load terminal means connected to said second main current carrying electrode;
- control means including: a resistor connected to said control electrode;
- at least one diode connected to said control electrode, said diode having N and P type conductivity electrodes, the connected diode electrode and control electrode being of like conductivity type;
- a first voltage source providing a first binary output voltage level more positive than the predetermined positive voltage value of said signal source;
- a second voltage source providing a second binary output voltage level more negative than the predetermined negative voltage value of said signal source;
- means for selectively applying said first and second binary voltage levels to said resistor and said diode;
  - said applying means being operable in a first mode to couple said first voltage source to at least one of said resistor and diode to condition said transistor to conduct zero current flow through said second main current carrying electrode coupled to said load terminal; and
  - said applying means being operable in a second mode to couple said second voltage source to said resistor and each diode coupled to said control electrode to condition said transistor to conduct both forward and reverse current flow through said second main current carrying electrode;
  - thereby to permit said transistor to provide an analog signal output having a dual polarity.

2. A circuit for time multiplexing a plurality of input signals into a single output providing positive, negative and zero signals, said multiplexing circuit comprising:
- a plurality of transistors, each having first and second main current carrying electrodes and a control electrode;
- a plurality of input signal sources connected respectively to the first main current carrying electrode of each of said plurality of transistors, said signal sources each providing a signal within predetermined positive and negative voltage values;
- means connecting said second main current carrying electrodes to a common output;
- a resistor connected to the control electrode of each of said transistors;
- at least one diode connected to the control electrode of each of said transistors;
- control means for sequentially conditioning said plurality of transistors to provide forward, reverse or zero collector current flow to said common output, said control means including:
  - means providing binary voltage levels respectively greater than and less than the predetermined positive and negative voltage values of said plurality of signal sources; and
  - switching means for selectively applying said binary voltage levels to each of the resistors and diodes connected to the control electrodes of said transistors.

3. The circuit of claim 2, further including a bistable multivibrator having output means connectable to an analog type of load, and input means responsive to said forward and reverse collector current flow at said common output for respectively selecting negative and positive output voltage states of said multivibrator, said bistable multivibrator being operable to hold in memory a previously selected output state in response to said zero current flow at said common output.

4. The circuit of claim 3, said bistable multivibrator including:
- first and second transistors, each having emitter, collector and base electrodes;
- means connecting the emitter electrodes of said first and second transistors in parallel to a voltage source of one polarity;
- resistor means respectively connecting the collector electrodes of said first and second transistors to a voltage source having a polarity opposite to said one polarity voltage source;
- a resistor connecting the base of said first transistor to the collector of said second transistor;
- a resistor and a diode connected in series between the base electrode of said second transistor and the collector electrode of said first transistor;
- said input means of said multivibrator including means connecting the common output of said multiplexing circuit to the common junction of said series connected resistor and diode; and said output means being connected to the collector electrode of said second transistor.

UNITED STATES PATENT OFFICE
CERTIFICATE OF CORRECTION

Patent No. 3,601,631 Dated August 24, 1971

Inventor(s) Donald K. Miller

It is certified that error appears in the above-identified patent and that said Letters Patent are hereby corrected as shown below:

Column 2, line 11, "In" should read -- If --; line 18, "I+flows" should read -- $I_+$ flows --; line 45, "$I_1$" should read -- $I_-$ --;

Column 3, lines 10-12, delete "it is to be noted that the scope of the present invention comprehends a system in which a larger number of dual polarity input signals,".

Signed and sealed this 7th day of March 1972.

(SEAL)
Attest:

EDWARD M.FLETCHER,JR.
Attesting Officer

ROBERT GOTTSCHALK
Commissioner of Patents